No. 621,808. Patented Mar. 28, 1899.
P. FRAZIER.
CULTIVATOR.
(Application filed June 27, 1898.)
(No Model.) 2 Sheets—Sheet 1.
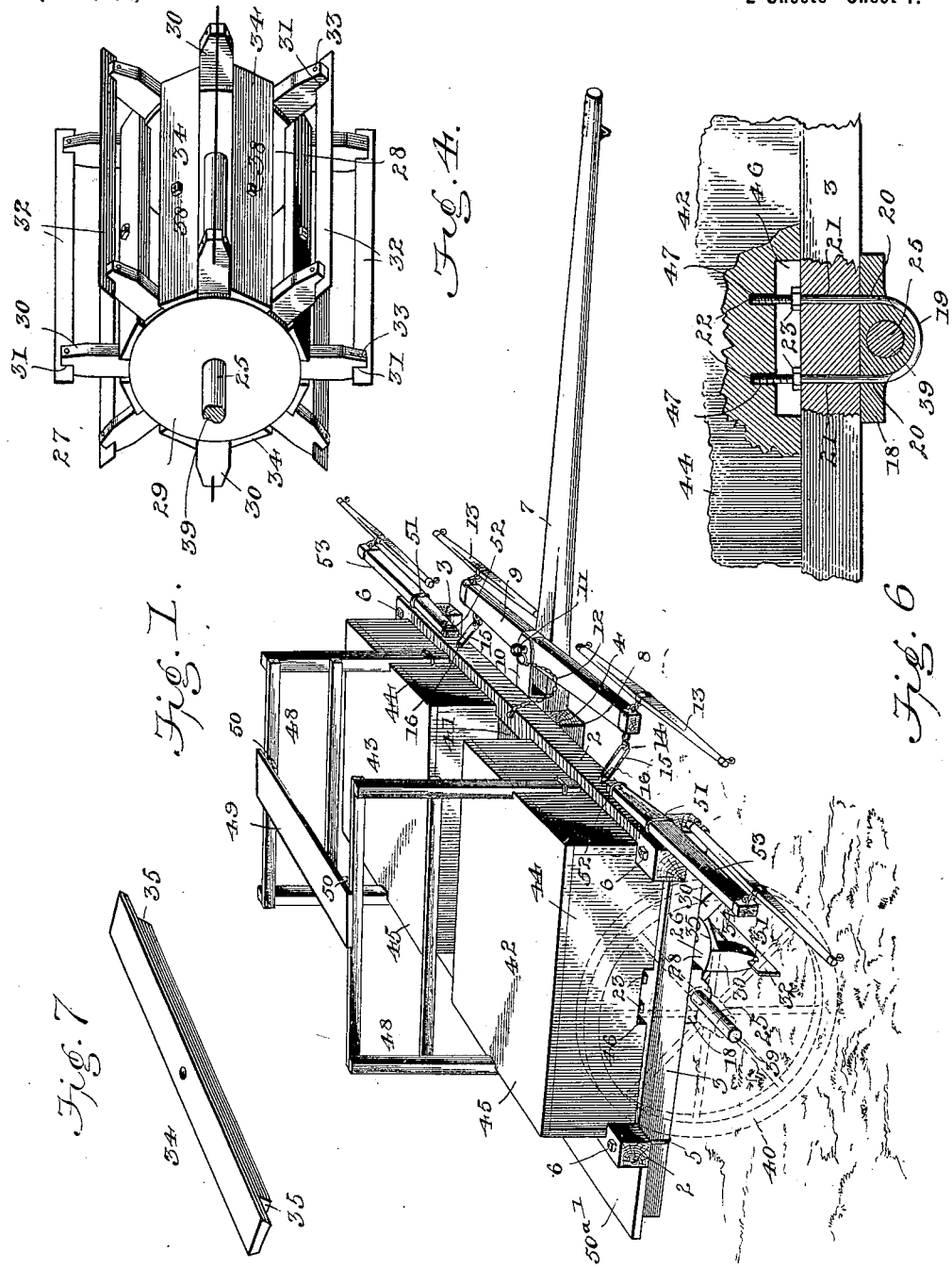
Presley Frazier Inventor

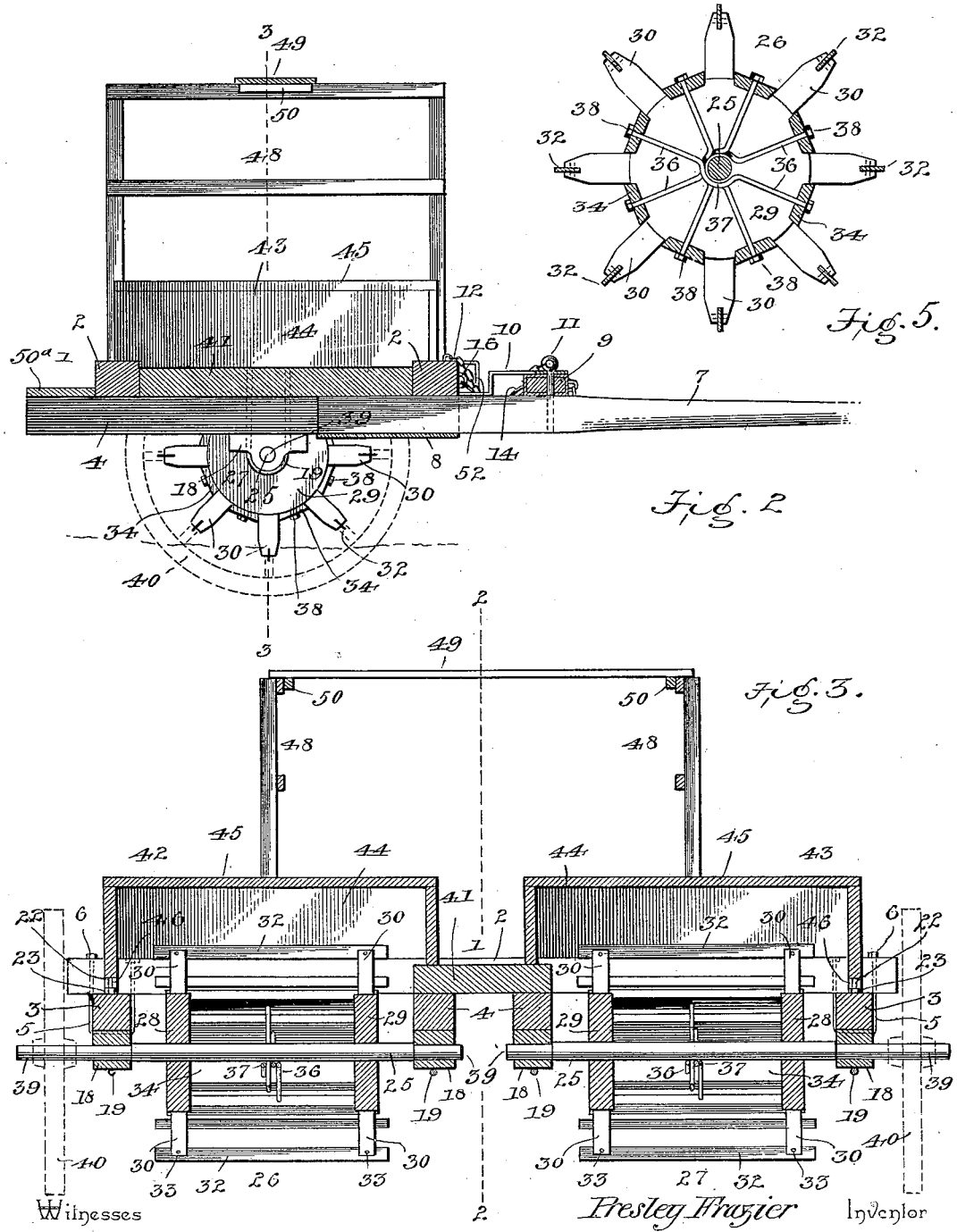

UNITED STATES PATENT OFFICE.

PRESLEY FRAZIER, OF GREAT BEND, KANSAS.

CULTIVATOR.

SPECIFICATION forming part of Letters Patent No. 621,808, dated March 28, 1899.

Application filed June 27, 1898. Serial No. 684,600. (No model.)

*To all whom it may concern:*

Be it known that I, PRESLEY FRAZIER, a citizen of the United States, residing at Great Bend, in the county of Barton and State of Kansas, have invented a new and useful Cultivator, of which the following is a specification.

My invention relates to improvements in agricultural machines especially designed for cultivating growing crops; and one object that I have in view is to provide an implement which may be used for pulverizing the soil or for rolling and leveling the ground by a few changes in the construction of the machine.

A further object of the invention is to provide a machine in which the draft appliances may be adjusted to change the line of draft or provide for the service of a variable number of draft-animals; and a further object is to provide means which will afford protection to the driver against injury by contact with the knives of the rotary cylinders, and also support a seat for the accommodation of the driver.

A further object of the invention is to simplify the construction of the machine with a view to promoting its strength and durability, increasing its efficiency, and cheapening the cost of manufacture.

With these ends in view the invention consists in the novel combination of elements and in the construction and arrangement of parts, which will be hereinafter fully described and claimed.

To enable others to understand the invention, I have illustrated the same in the accompanying drawings, forming a part of this specification, and in which—

Figure 1 is a perspective view of a cultivator constructed in accordance with my invention. Fig. 2 is a vertical longitudinal sectional elevation on the plane indicated by the dotted line 2 2 of Fig. 3. Fig. 3 is a vertical transverse section on the plane indicated by the dotted line 3 3 of Fig. 2. Fig. 4 is a detail perspective view of one of the rotary cylinders. Fig. 5 is a cross-sectional elevation through the cylinder shown by Fig. 4. Fig. 6 is a detail sectional view, on an enlarged scale, through one of the axle-bearings, its fastening means, and a portion of the frame of a housing which affords protection to the driver against injury from the knives of a rotary cylinder.

Like numerals of reference denote like and corresponding parts in each of the several figures of the drawings.

1 designates the horizontal main frame of the implement, which consists of the longitudinal sills 2, the transverse end sills 3, and the central transverse sills 4. The longitudinal sills 2 are arranged to overlap the transverse sills 3 4, and all these sills are bound firmly together by the U-shaped straps 5, each of which embraces one of the transverse sills and has its threaded legs extended or carried through the longitudinal sill for the reception of the nuts 6, which serve to draw the strap and transverse sill firmly against the longitudinal sill. The central sills 4 4 are spaced apart parallel to each other for the reception between them of the rear end of the draft-tongue 7, which rests upon the supporting-plate 8, that is arranged below the sills 4 and is firmly secured thereto by bolts or screws. This draft-tongue carries a doubletree 9, which is fitted beneath the overhanging end of a clip 10, the rear end of which is firmly secured to the upper side of the draft-tongue 7. The doubletree is attached pivotally to the draft-tongue by a removable pivotal bolt 11, which passes through coincident openings provided in the overhanging end of the clip 10, the doubletree, and the draft-tongue, and to the upper end of this pivotal bolt is attached a chain 12, which is secured to the main frame 1 and prevents accidental loss of said bolt when the doubletree is detached from the machine. To the ends of the doubletree are detachably connected the singletrees 13, and the ends of the doubletree are loosely connected by the stay-chains 14 with the main frame. These stay-chains are equipped with the open or separable links 15, which are attached to the eyebolts 16, secured to the front longitudinal sill of the main frame, thus providing for the detachable connection of the stay-chains to the main frame and allowing the point of attachment of said stay-chains to be shifted along the main frame.

18 designates a series of axle-bearings which are applied against the lower edges of the transverse sills 3 4 of the main frame, and these axle-bearings are arranged centrally on said frame 1 and in alinement with each other. Each axle-bearing is provided with a pair of openings 20, situated on opposite sides of the axle-receiving opening and coincident with openings 21 in the transverse sill, against which the axle-bearing is applied. A U-shaped strap-iron 19 is passed through the coincident openings in the axle-bearing of the sill, and the upper ends of each strap-iron are extended, as at 22, above the face of the sill, thus providing for the attachment of a cylinder-housing to the upper side of the frame, as will hereinafter appear. These extended ends 22 of each strap-iron 19 are externally threaded for the reception of the clamping-nuts 23, that serve to draw the strap-iron upwardly and bind the axle-bearing firmly against the frame-sill to which it is applied.

In each pair of alined axle-bearings is journaled the horizontal axle 25, and in my machine I employ two of these axles, which are in alinement with each other across the machine. Said axles are mounted independently of each other in the bearings for rotation with the cylinders which are supported on the axles. The cylinders for the two axles are indicated by the numerals 26 and 27, and they lie on opposite sides of the longitudinal central line of the machine. Each cylinder consists of a pair of parallel heads 28 29, which are fitted on one of the axles at suitable distances from each other and are secured firmly to said axle by keys or other suitable fasteners. The two heads of each cylinder are provided with radial arms 30, which are cast integral with said heads, and the two heads are fastened to the axle to make the arms 30 assume parallel coincident positions. The outer ends of the radial cylinder-arms are notched to provide the seats 31, that receive the extremities of the cutter-blades 32. These cutter-blades are arranged circumferentially around the cylinder to lie radially thereto, and they are securely fastened in the notched seats of the radial arms by transverse rivets or bolts 33, which pass through the arms and the blades within the cutting edges of the latter, said cutting edges of the blades being extended beyond the terminals of the radial arms 30.

Each cylinder is of skeleton construction to insure lightness, strength, and stability thereto, and it is equipped with a plurality of radial blades, which have their cutting edges exposed for properly acting on the ground to pulverize the same, and thereby enable the machine to be used for cultivating the growing crop, which may be planted either in hills or drilled in the ground. I also contemplate the employment of devices for use in connection with the rotary cylinders for the purpose of using the machine to roll and level the ground, and the devices which I employ are readily attachable to the cylinders to enable the latter to be used as rollers, and they are also easily and quickly removable from said cylinders when the latter are to perform their primary offices as cultivators. A series of crusher-bars 34 may be used in connection with each rotary cylinder, and each crusher-bar is notched or recessed at its ends to provide the shoulders 35, which may be fitted snugly against the heads of the cylinder to restrain each bar 34 against endwise movement or displacement on the cylinder-heads. The crusher-bars are designed to be placed on the cylinder-heads in the intervals between the radial arms 30 of said heads, and the shoulders 35 of the bars bear against the opposing faces of the cylinder-heads to prevent endwise movement of said bars. The crusher-bars are held firmly in place on the cylinders by suitable attaching devices, and in the embodiment of the invention represented by Figs. 4 and 5 the attaching devices are shown in the form of stays or bolts 36, each of which is bent, as at 37, to clear the axle 25 and provided with threaded ends, which are extended through oppositely-placed bars 34, for the reception of the nuts 38, that bear against the bars and hold them firmly in position on the edges of the cylinder-heads. The employment of the crusher-bars increases the working area of each cylinder, so that it is well adapted for use as a roller in pressing and leveling the ground, and these presser-bars lie within the circle described by the cutter bars or blades 32, thus making each cylinder serve the double purpose of a pulverizer and roller. It is evident that the crusher-bars may be easily and quickly secured to the cylinder by secure fastenings, and the bars may in like manner be quickly detached.

The axles 25 are extended through their bearings at the outer ends of the machine, such extensions of the axles being indicated by the numerals 39. On said extended axle ends are loosely fitted the carrying-wheels 40, which are only employed when the machine is to be moved from one place to another in order to hold the cylinders in elevated positions and free from contact with the ground; but when the machine reaches the field where it is to be used these carrying-wheels 40 are removed from the axles, and the cylinders thus allowed to rest upon the surface of the ground.

My machine is equipped with a seat for the accommodation of the driver, and to prevent the driver from having contact accidentally with the knives of the cylinders the machine is provided with the housings 42 43, which are detachably fitted to the main carrying-frame 1 to lie over the rotary cylinders. The inner ends of these removable housings rest upon a narrow longitudinal platform 40, which is secured to the parallel central sills 4 of the carrying-frame by the bolts or straps which unite the axle-bearings to said sills 4. Each housing consists of a frame 44 and a casing 45, the parts being united firmly together to produce a substantial structure. The outer end rail of each housing is provided in its lower edge with a central notch 46 to receive the nuts 23 on the U-shaped strap-irons 19, and these notches provide for the introduction of a wrench, which may be readily engaged with the nuts 23 to tighten the latter without removing the housing from the machine-frame. In said notched end rail of the housing are provided the vertical sockets 47, which open through the notch 46 and are adapted to receive the extended upper extremities 22 of the strap-iron 19, and said extended ends 22 thus serve to engage with the housing and prevent displacement thereof on the main carrying-frame.

The housings 42 43 are equipped with the vertical frames 48, which extend a suitable distance above the main frame and lie parallel to each other on opposite sides of the draft-tongue, and said vertical frames 48 sustain a horizontal seat-board 49, which is equipped with cleats 50 to restrain the seat-board from endwise movement on the vertical frames 48.

At the rear end of the machine a longitudinal platform 50ª is attached to extended ends of the transverse sills 3 4.

In my machine I construct the frame with draft appliances by which additional draft-animals may be hitched to the frame outside of the animals hitched to the single and double trees, and to this end keepers 51 are rigidly attached to the front rail of the frame at the outer ends thereof. To these keepers 51 may be detachably connected extra singletrees when it is desired to employ more than two draft-animals for hauling the machine across the field.

Between the draft-keepers 51 and the eyebolts 17 are arranged draft-staples 52, which are situated about midway between said keepers 51 and the eyebolts 17. To these draft-staples 52 may be connected the links 15 and stay-chains 14 when it is desired to change the line of draft on the machine-frame.

If desired, extension-arms 53 may be attached to the frame for hitching additional draft-animals to the machine outside of the end rails of the frame 1.

Slight changes may be made in the form of some of the parts, while their essential features are retained and the spirit of the invention embodied. Hence I do not desire to be limited to the precise form of all the parts as shown, reserving the right to vary therefrom.

Having thus described the invention, what I claim is—

1. A cultivator comprising a main carrying-frame, axles journaled independently thereon and having their outer ends extended beyond the end sills of said frame for the reception of carrying-wheels, and rotary cylinders mounted on said axles and provided with radial cutter-bars, substantially as described.

2. In a cultivator, a rotary cylinder consisting of an axle, the heads secured to said axle, the radial arms integral with the heads and provided in their outer ends with central notches, and cutter-bars fitted in said notches and secured to the radial arms to have their working edges extended and exposed beyond the terminals of the arms, substantially as described.

3. In a cultivator, a rotary cylinder comprising the armed heads, cutter-bars secured to said arms of the heads, and crusher-bars fitted to the heads in the intervals between the arms thereof and secured detachably to the cylinder, substantially as described.

4. In a cultivator, a rotary cylinder comprising heads provided with radial spaced arms, cutter-bars secured to said arms, crusher-bars fitted to the edges of the heads in the intervals between the arms thereof to lie within the cutter-bars and provided with shoulders which bear against opposing faces of the heads, and stay-bolts attached to the crusher-bars in pairs and serving to detachably hold said crusher-bars in position on the cylinder-heads, substantially as described.

5. In a cultivator, a main frame, axle-bearings fitted thereto, stay-bolts or strap-irons passing through the bearings and frame and having nuts fitted to the ends which are extended above the frame, in combination with a rotary cylinder, and a housing resting upon the frame and receiving the extended ends of the strap-irons, substantially as described.

6. A cultivator comprising a main frame having a platform at its middle, rotary cylinders within said frame, axle-bearings fitted to the lower sides of the frame, the strap-irons passing through the frame and axle-bearings and having their upper ends extended above the frame, nuts screwed on said extended ends of the strap-irons, the housings arranged over the cylinders and resting at their adjacent inner ends upon the platform and having their outer ends provided with notches and with sockets to receive the extended ends of the strap-irons, and a seat supported upon the housings, substantially as described.

7. A cultivator comprising a main frame having the spaced parallel sills at the middle thereof, a supporting-plate attached to the sills, a draft-tongue fitted between the sills and resting upon the plate, a doubletree, the eyebolts attached to the front sill of said frame, the stay-chains between the ends of the doubletree and the eyebolts, the keepers fastened to the front of the frame at the ends thereof, and the draft-staples also fastened to the front of the frame at points between the eyebolts and the keepers, substantially as described.

In testimony that I claim the foregoing as my own I have hereto affixed my signature in the presence of witnesses.

PRESLEY his × mark FRAZIER.

Witnesses:
H. C. SELLERS,
DAVID L. PAGE,
B. F. OGLE.